United States Patent Office 2,966,464
Patented Dec. 27, 1960

2,966,464

METHOD OF MAKING SILVER ACTIVATED SULPHIDE PHOSPHORS

Richard C. Ropp, Towanda, Pa., assignor, by mesne assignments, to Sylvania Electric Products Inc., Wilmington, Del., a corporation of Delaware No Drawing. Filed Oct. 28, 1957, Ser. No. 692,551

6 Claims. (Cl. 252—301.6)

This invention relates to zinc sulphide, cadmium sulphide and zinc-cadmium sulphide phosphors and more particularly to a method of making silver activated phosphors of these types.

As is well known the presence of very small quantities of silver as an activator in phosphors of the zinc sulphide type causes such phosphors, when excited, to produce emission further in the blue range than the unactivated material, the intensity or depth of the blue color varying generally with the amount of silver present in the phosphor. This phenomenon is noted by Leverenz on page 206 of his "An Introduction to Luminescence of Solids," John Wiley & Sons, Inc., 1950. The emission characteristics of these phosphors have made them extremely useful in compositions for cathode ray tube screens for monochromatic television and, in the higher ranges of silver content, for color television.

For use in cathode ray tube screens for monochromatic television it is normally unnecessary to incorporate more than about 0.01% by weight of silver in the zinc sulphide phosphor. However, for some monochromatic television applications, and in particular, for color television purposes, silver in excess of 0.01% by weight has been included in the phosphor compositions to obtain a more saturated blue emission. Unfortunately, for the reasons set forth below, rather than because phosphors of the ultimate desired depth of blue have been obtained thereby, there has been heretofore a practical limit of about 0.02% by weight on the quantity of silver which could be incorporated in these phosphors.

In prior attempts to increase the blue emission of zinc sulphide phosphors it was found that an undesirable increase in the reflected or "body" color accompanied the increase in silver content, the resulting phosphors being of a brown or gray hue rather than ideally white. Furthermore, upon exposure to cathode rays the body color tended to increase and the brightness of the emitted light to decrease. This increase in body color and decrease in brightness, generally referred to as "burn" in the industry is attributable to various factors, but apparently the initial presence or subsequent appearance of metallic silver on the surface of the phosphor grains on exposure to cathode rays contributes in substantial measure to the problem. Although this problem has been particularly significant when efforts have been made to incorporate more than 0.02% silver in zinc sulphide phosphors, it has been observed in the preparation of phosphors of lesser silver content, e.g. phosphors containing as low as 0.01% of silver.

The primary purpose of adding silver as an activator to cadmium sulphide and zinc-cadmium sulphide phosphors is to obtain materials having a greater intensity of emission or brightness rather than to achieve a shift in the color of the emission. However, as in the case of zinc sulphide, and at substantially the same degree of silver addition to the phosphors, there has been observed objectionable body color and the tendency for the phosphors to develop burn on exposure to cathode rays. This has resulted in a decrease in visual brightness of the phosphors. Although the method of the present invention will be described below with reference to zinc sulphide it is in fact equally applicable to cadmium sulphide and zinc cadmium sulphide phosphors.

Accordingly, it is an object of my invention to provide an improved method for producing zinc sulphide, cadmium sulphide and zinc-cadmium sulphide phosphors.

A further object is to provide a method for producing zinc sulphide, cadmium sulphide and zinc-cadmium sulphide phosphors containing relatively high percentages of silver as an activating material.

It is a further and more specific object to provide a method for manufacturing zinc sulphide, cadmium sulphide and zinc-cadmium sulphide phosphors which contain relatively large amounts of silver as an activator, but which are free of the objectionable body color and the tendency to develop burn heretofore associated with silver activated phosphors of these types.

To afford a full appreciation of the respects in which the method hereinafter disclosed and claimed differs from and constitutes a distinct improvement over the method generally employed prior to this invention, the prior art procedure is described as follows, with specific reference to the preparation of a zinc sulphide phosphor.

Normally, pure zinc sulphide is first blended, as by milling, with a small quantity (e.g., 0.5% to 8.0% by weight) of an alkali or alkaline earth chloride, and a predetermined small quantity of silver in the form of a silver salt such as, for example, silver nitrate. Alternatively, the silver may be coprecipitated as a sulphide along with the zinc sulphide. The function of the chloride in the mixture is to serve as a flux in the subsequent firing operation and to afford the desired granular and surface characteristics in the final phosphor. Since only a small amount of the chloride is required, it may be unnecessary to specifically add it just prior to the firing operation. For example, chlorides in sufficient quantity may be present in the initial sulphide as a result of its particular method of prepartion. After the powders are thoroughly blended, the mixture is placed in a suitable container, typically a silica crucible, and fired at a temperature ranging between 650° C. and 1100° C. for a time (e.g., about 10 minutes to about 6 hours) depending on the firing temperature and the size of the batch of phosphor.

At the conclusion of the firing step, the phosphor is allowed to cool to approximately room temperature in the crucible. It has been the practice then to break up the fired cake and wash thoroughly with water one or more times to remove the excess flux from the material. In some cases ammonium hydroxide solution has been used for this same purpose. After the washing, the material is dried to obtain the final granular product.

As indicated generally above, this procedure has resulted in satisfactory phosphors as long as the silver incorporated in the phosphor does not exceed about 0.01% by weight. However, the aformentioned objectionable body color and tendency to develop burn has resulted when attempts are made to increase the silver content, particularly where silver contents of the order of 0.02% and greater are employed.

I have found that a product free of these objectionable characteristics can be produced in the manner described above if the phosphor is washed with a solution of a soluble thiosulpate promptly after the phosphor has been cooled down from the firing operation. The thiosulphate wash is then followed by one or more washes with water. Any soluble thiosulphate compound can be employed in the wash solution. Apparently, after the firing operation, the phosphor granules are sufficiently inert to attack by the wash so that the metal ion of the thiosulphate compound has no apparent effect on the phosphor during its brief contact in the washing operation. For cost reasons, soluble thiosulphates of the alkali and alkaline-earth metals are preferable. Of these, sodium thiosulphate is the most readily available and was used in the examples of the method of my invention set forth below. It has been found that the concentration of the thiosulphate wash solution is not critical, the desired result being achieved with solutions varying from very dilute to nearly saturated solutions. Accordingly, for cost reasons, and in view of the fact that the washing operation is best accomplished with a relatively large volume ratio of wash solution to solid phosphor, it is preferable to employ relatively dilute solutions of the order of about 1 to 5% by weight of the thiosulphate salt.

It has been found that in the preparation of silver activated zinc sulphide phosphors a saturation effect appears at a silver content of about 0.04% by weight of the zinc sulphide. Additional silver beyond this level of content apparently does not take up substitutional or interstitial sites within the crystal structure of the zinc sulphide so that no increase in brightness or depth of blue color of the emission from the phosphor normally is realized by the addition of more than 0.04% silver to the phosphor. It may be desirable however, to incorporate substantially more than this quantity of silver as a silver salt to insure equilibrium conditions conducive to a high lattice silver concentration. With the present method, the excess silver in ionic form which remains on the surfaces of the zinc sulphide granules apparently is readily removed after firing by the thiosulphate washing step. Thus substantial excesses of silver can be incorporated with impunity with the zinc sulphide and flux without danger of the ultimate phosphor having objectionable body color or tendency to develop burn. For example, as much as 2.0% by weight of silver can be added without the development of these objectionable characteristics.

In order that those skilled in the art better may understand how the present invention may be carried into effect, the following examples are given by way of illustration and not by way of limitation. All percentages are by weight.

*Example I*

100 grams of zinc sulphide containing 0.035% silver as silver nitrate was blended thoroughly in a ball mill with 6 grams of magnesium chloride and 7 grams of barium chloride. The mixture was then placed in a 150 ml. silica crucible and fired in air for thirty minutes at about 975° C. The contents of the crucible were allowed to cool to room temperature and were then promptly added to one liter of an aqueous solution containing 2.5% sodium thiosulphate. The solution was stirred sufficiently to thoroughly suspend the phosphor. The phosphor was then allowed to settle, the solution was decanted off, and the phosphor was washed three times more in pure water. Upon drying, the phosphor was found to be pure white, with no observable body color. No body color or decrease in brightness of emission resulted on exposure to cathode rays.

*Example II*

100 grams of zinc sulphide containing 0.04% silver as silver sulphide was mixed thoroughly with 1.5 grams of sodium chloride. The mixture was fired in air for about 1 hour in a silica crucible at about 940° C. After the mixture was cooled it was promptly washed thoroughly by suspending and agitating the granular material in a liter of a solution containing 5% sodium thiosulphate. After the suspension was allowed to settle, the solution was decanted off and the phosphor was then re-suspended and washed three times in water. After drying, the phosphor was found to be extremely white and did not develop body color or burn on exposure to cathode rays.

I have found that the method described above is particularly effective if, as promptly as practicable after cooling, the phosphor is immersed in the thiosulphate wash solution. This is because prolonged exposure of the phosphor to moisture and/or light promotes conversion of the ionic silver on the surface of the phosphor granules into free or metallic silver which cannot be removed by the washing technique herein described. Although it is generally practicable to bring the phosphor into contact with the thiosulphate solution with sufficient promptness to avoid objectionable formation of metallic silver, it is advantageous to cool the phosphor and deposit it in the thiosulphate solution in the absence of light.

The table below sets forth the results of tests made on samples of four zinc sulphide phosphors prepared from a starting mixture containing silver and sodium chloride in the amounts indicated in Example II, above. The method described in Example II was used in preparing the first phosphor in the table. The same method was used in making the last three phosphors except that following the firing operation the washing procedure specified in the first column of the table was employed rather than the washing procedure described in Example II.

| Wash | Body Color | Visual Brightness | Burn Color |
| --- | --- | --- | --- |
| 5% Na$_2$S$_2$O$_3$ sol'n. (1 wash) plus Water (3 washes). | white | 105 | white. |
| Water (3 washes) | brown | 100 | gray. |
| Water (3 washes in dark) | brown | 100 | gray. |
| 20% NH$_4$OH sol'n. (1 wash) | brown | 100 | gray. |

Referring to the above table, the body color was observed prior to exposing the phosphor to cathode ray excitation. The visual brightness figures were based on comparison with a standard phosphor excited simultaneously and in the same cathode ray tube with the specimen tested. The standard had a brightness level of 100. The "burn color" was observed after exposure for one minute in the cathode ray tube.

While the invention has been described with reference to its application to zinc sulphide phosphors, it is to be understood that it is similarly applicable in the production of cadmium sulphide and zinc-cadmium sulphide phosphors.

I claim:

1. In the method of making a phosphor comprising the fired reaction product of a sulphide of the group consisting of zinc sulphide, cadmium sulphide and zinc-cadmium sulphide and a silver salt, the step of washing the fired product with an aqueous solution of a thiosulphate compound.

2. In the method of making a phosphor comprising the fired reaction product of a sulphide of the group consisting of zinc sulphide, cadmium sulphide and zinc-cadmium sulphide and a small quantity of a silver salt as an activator for said phosphor, the steps of washing the phosphor with an aqueous solution of a thiosulphate promptly upon cooling the phosphor after the firing operation, and thereafter subjecting said phosphor to further washing with water.

3. The method of making a phosphor which comprises thoroughly mixing a sulphide of the group consisting of zinc sulphide, cadmium sulphide and zinc-cadmium sulphide with a chloride flux and an activating quantity of a silver compound, firing the resulting mixture, cooling the mixture to approximately room temperature, washing the phosphor with a dilute aqueous solution of a thiosulphate, and thereafter washing the phosphor with pure water.

4. The method of making a zinc sulphide phosphor which comprises thoroughly mixing zinc sulphide with a small quantity of a chloride selected from the group consisting of chlorides of the alkaline and alkaline earth metals, and an activating quantity of a silver compound, firing the resulting mixture at a temperature in the range of 650° C. to 1100° C., cooling the fired mixture to approximately room temperature and promptly washing the phosphor with an aqueous solution of a thiosulphate compound.

5. In the method of making a phosphor consisting essentially of the fired reaction product of zinc sulphide with a chloride flux and from about 0.01% to about 2.0% by weight of silver in the form of a silver compound, the step of washing the fired product with an aqueous solution of a thiosulphate compound selected from the group consisting of alkaline and alkaline earth metal thiosulphates.

6. In the method of making a zinc sulphide phosphor consisting essentially of the fired reaction product of zinc sulphide, a flux and a silver compound, the step of washing the phosphor with an aqueous solution of a thiosulphate compound in the absence of light.

References Cited in the file of this patent

UNITED STATES PATENTS

| | | |
|---|---|---|
| 2,252,590 | Wolfson | Aug. 12, 1941 |
| 2,615,849 | Markoski | Oct. 28, 1952 |
| 2,727,865 | Markoski | Dec. 20, 1955 |
| 2,817,599 | Edwards | Dec. 24, 1957 |

FOREIGN PATENTS

| | | |
|---|---|---|
| 519,042 | Great Britain | Mar. 14, 1940 |